(12) United States Patent
Horii

(10) Patent No.: US 8,194,400 B2
(45) Date of Patent: Jun. 5, 2012

(54) ELECTRONIC DEVICE

(75) Inventor: Yasuyuki Horii, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 130 days.

(21) Appl. No.: 12/852,262

(22) Filed: Aug. 6, 2010

(65) Prior Publication Data

US 2011/0141678 A1 Jun. 16, 2011

(30) Foreign Application Priority Data

Dec. 11, 2009 (JP) ................................. 2009-282106

(51) Int. Cl.
*G06F 1/16* (2006.01)
(52) U.S. Cl. ................... 361/679.08; 174/535; 257/693; 165/104.33
(58) Field of Classification Search ................. 174/520, 174/260, 252, 258, 535, 264; 361/704, 719, 361/715, 705, 748, 784, 679.08, 679.54, 361/679.47; 257/48, 522, 288, 506, 693; 165/104.26, 185, 80.4, 104.33, 80.2; 315/207, 315/291; 455/566
See application file for complete search history.

(56) References Cited

U.S. PATENT DOCUMENTS

| | | | |
|---|---|---|---|
| 5,353,934 A | 10/1994 | Yamauchi | |
| 6,696,643 B2 * | 2/2004 | Takano | 174/520 |
| 7,643,297 B2 * | 1/2010 | Tominaga et al. | 361/704 |
| 2009/0211796 A1 * | 8/2009 | Chinda et al. | 174/260 |
| 2009/0264160 A1 * | 10/2009 | Mochizuki et al. | 455/566 |

FOREIGN PATENT DOCUMENTS

| | | |
|---|---|---|
| JP | 64-008789 U | 1/1989 |
| JP | U03-26025 | 3/1991 |
| JP | 03-098480 U | 10/1991 |
| JP | 06-064678 | 3/1994 |
| JP | 06-064678 A | 3/1994 |
| JP | 09-283950 | 10/1997 |
| JP | 09-283950 A | 10/1997 |
| JP | 11-202978 A | 7/1999 |
| JP | 2000-106493 A | 4/2000 |
| JP | 2001-142575 A | 5/2001 |
| JP | 2004-288913 A | 10/2004 |
| JP | 2004-297919 | 10/2004 |
| JP | 2004-297919 A | 10/2004 |

(Continued)

OTHER PUBLICATIONS

Notice of Rejection mailed on Oct. 19, 2010 by the Japan Patent Office in the corresponding Japanese patent application No. 2009-282106.

(Continued)

*Primary Examiner* — Hung Duong

(74) *Attorney, Agent, or Firm* — Knobbe Martens Olson & Bear LLP

(57) ABSTRACT

According to one embodiment, an electronic device, includes: a first housing; a second housing comprising a first wall portion, a first end portion, and a second end portion, the first wall portion being provided with a keyboard mounting portion on which a keyboard is mounted, the second end portion opposing the first end portion; a hinge portion provided near the first end portion, and rotatably connecting the first housing and the second housing; a circuit board housed in the second housing, and positioned between the keyboard mounting portion and the second end portion; and a flexible first support portion supporting the circuit board so that the circuit board is spaced apart from the first wall portion.

10 Claims, 11 Drawing Sheets

FOREIGN PATENT DOCUMENTS

| | | |
|---|---|---|
| JP | 2005-039128 A | 2/2005 |
| JP | 2005-256982 A | 9/2005 |
| JP | 2007-026371 A | 2/2007 |
| JP | 2008-251689 A | 10/2008 |
| JP | 2009-110296 A | 5/2009 |
| JP | 2009-119672 A | 6/2009 |
| JP | 2009-157828 A | 7/2009 |
| WO | WO 2007/029311 A1 | 3/2007 |

OTHER PUBLICATIONS

Notice of Reasons for Rejection mailed by Japan Patent Office on Apr. 19, 2011 in the corresponding Japanese Patent Application No. 2011-037114.

Decision of a Patent Grant mailed by Japan Patent Office on Sep. 13, 2011 in the corresponding Japanese Patent Application No. 2011-037114.

* cited by examiner

ELECTRONIC DEVICE

CROSS-REFERENCE TO RELATED APPLICATIONS

This application is based upon and claims the benefit of priority from Japanese Patent Application No. 2009-282106, filed on Dec. 11, 2009, the entire contents of which are incorporated herein by reference.

FIELD

Embodiments described herein relate generally to an electronic device.

BACKGROUND

There has been disclosed a technology to fix a substrate in a housing such as a personal computer (PC) by fixing portions, and not by conventional screws (for example, see Japanese Patent Application Publication (KOKAI) No. H06-64678). The housing is configured by a top cover and a bottom cover, and the fixing portions are provided between the top cover and the substrate and between the substrate and the bottom cover. According to the technology, direct contact between the housing and the substrate can be prevented, thereby an amount of generated particulates due to the contact between the housing and the substrate resulted by vibration at the time of manufacture and the like can be suppressed.

Recently, a metallic housing is often used for an electronic device (particularly, a notebook PC) to prevent the strength of the electronic device to be lowered due to decrease in thickness of the electronic device. However, the metallic housing has fast heat conduction in comparison to a resin housing, and a user tends to feel the heat. Hence, in the electronic device, there is a need for a technology to prevent the heat to be transferred to the housing from a central processing unit (CPU), a memory, and the like mounted on the substrate.

According to the conventional technology, the direct contact between the housing and the substrate can be prevented. Therefore, by utilizing the fixing portions held between the top cover and the substrate and between the bottom cover and the substrate to fix the substrate, the heat conducted to the housing from the electronic component mounted on the substrate can be reduced within a certain degree. However, the fixing portions are supposed to be used as a tool at the time of manufacture, and are not supposed to be used to handle heat within the electronic device.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device, comprises: a first housing; a second housing, a hinge portion, a circuit board, and a flexible first support portion. The second housing comprises a first wall portion, a first end portion, and a second end portion. The first wall portion is provided with a keyboard mounting portion on which a keyboard is mounted. The second end portion opposes the first end portion. The hinge portion provided near the first end portion, and rotatably connecting the first housing and the second housing. The circuit board housed in the second housing, and positioned between the keyboard mounting portion and the second end portion. The flexible first support portion supporting the circuit board so that the circuit board is spaced apart from the first wall portion.

According to another embodiment, an electronic device comprises: a substrate, a heat generating electronic component being mounted on at least one of a first face and a second face opposing the first face of the substrate; a first heat insulating member provided on the first face; a second heat insulating member provided on the second face; and a housing holding the substrate from both sides of the first face and the second face via the first heat insulating member and the second heat insulating member.

According to still another embodiment, an electronic device, comprises: a substrate, a heat generating electronic component being mounted on at least one of a first face and a second face opposing the first face of the substrate; a heat generating member provided on both of the first face and the second face; and a housing holding the substrate from both sides of the first face and the second face via the heat insulating member.

In the following, an embodiment of an electronic device is explained with reference to the drawings. In the embodiment, an electronic device is applied to a laptop personal computer (portable computer). However, the electronic device is not limited to be applied to the portable computer, and the electronic device can be applied to any devices such as a portable telephone, as long as a thickness of the device is required to be reduced.

Figure 1:
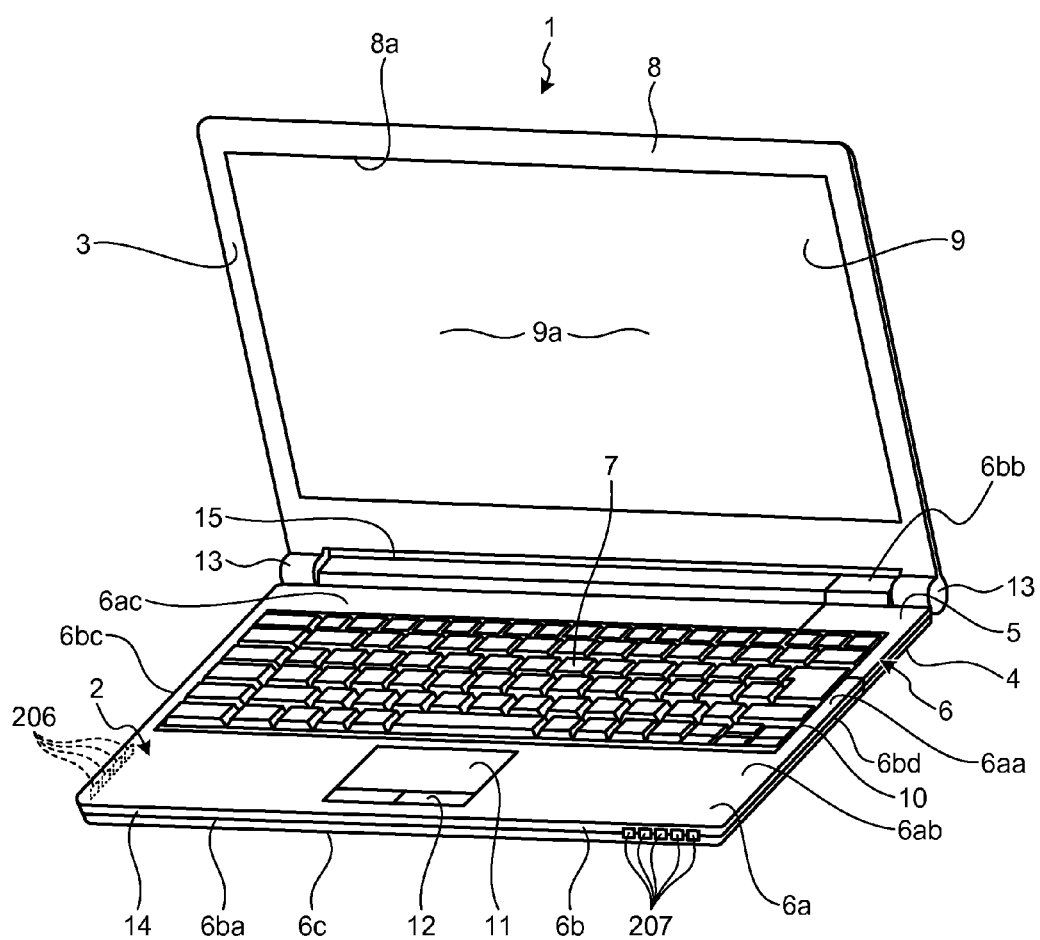
FIG. 1 is an exemplary perspective view from a front side of a portable computer according to an embodiment.
Figure 2:
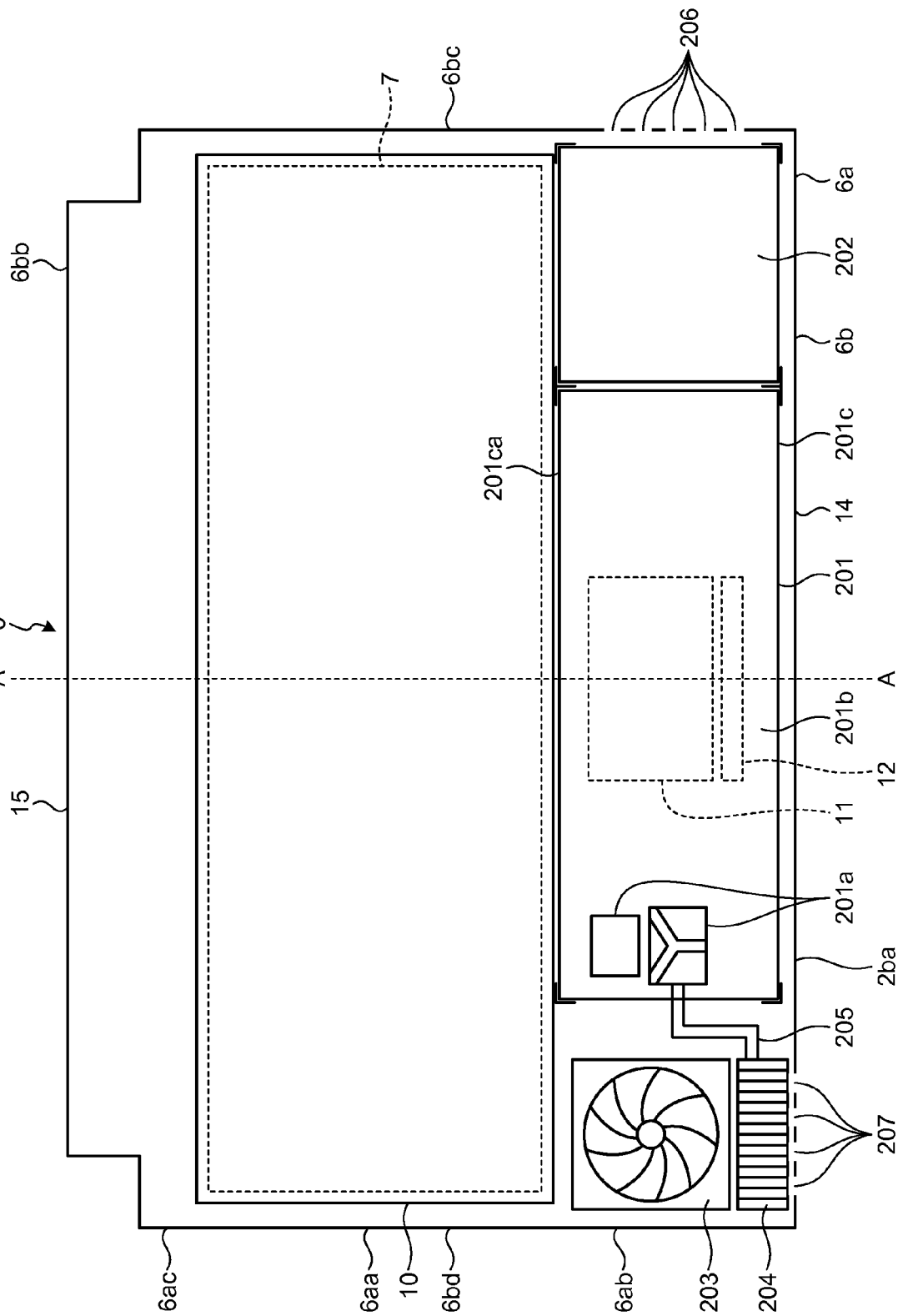
FIG. 2 is an exemplary view of various components mounted on a main body cover of the portable computer in the embodiment.
Figure 3:
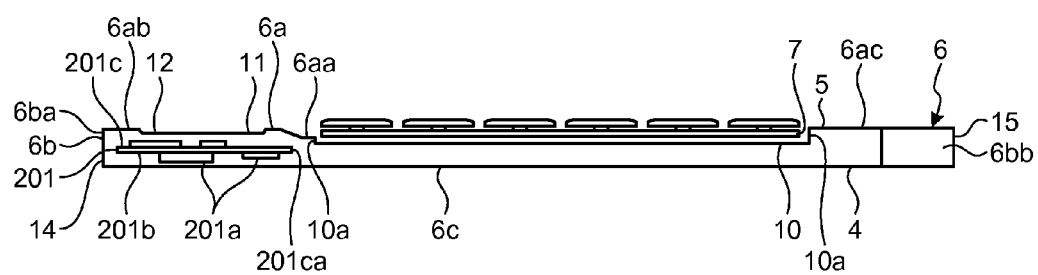
FIG. 3 is an exemplary cross sectional view taken along a line A-A of a main body of the portable computer in the embodiment.

A structure of a portable computer 1 according to the embodiment is explained with reference to FIGS. 1 and 2. FIG. 1 is a perspective view as seen from a front side of the portable computer 1 of the embodiment. FIG. 2 is a view illustrating various components mounted on a main body cover of the portable computer 1 of the embodiment. FIG. 3 is a cross sectional view taken along a line A-A of a main body of the portable computer 1 of the embodiment.

The portable computer 1 of the embodiment comprises a main body 2 and a display unit 3.

The display unit 3 comprises a display housing 8 and a liquid crystal display (LCD) panel 9 housed in the display housing 8. The LCD panel 9 comprises a display screen 9a. The display screen 9a is exposed to outside of the display housing 8 via an opening portion 8a at a front face of the display housing 8.

The display unit 3 is supported via a hinge 13 attached to the main body 2. Consequently, the display unit 3 can be rotated between a close position and an open position. At the close position, the display unit 3 is tipped down so as to cover a main body cover 5 from thereabove. In other words, at the close position, the display screen 9a is covered. At the open position, the display unit 3 stands up so as to expose the main body cover 5. In other words, at the open position, the display screen 9a is exposed.

The main body 2 comprises a housing 6. The housing 6 is configured by a main body base 4 and the main body cover 5 assembled with the main body base 4 from thereabove. The housing 6 is formed in a box-shape by assembling the main body cover 5 with the main body base 4 from above the main body base 4. In order to prevent the strength of the portable computer 1 (main body 2) to be lowered due to the reduction of the thickness of the portable computer 1, the housing 6 is formed of metal such as magnesium alloy. In the embodiment, the housing 6 is configured by two bodies of the main body base 4 and the main body cover 5. However, the embodiment is not limited thereto, and the housing 6 may be configured by a single body, or may be configured by a plurality of bodies.

The housing 6 comprises a top wall 6a, a bottom wall 6c opposing the top wall 6a, and a peripheral wall 6b provided along an outer edge of the top wall 6a and the bottom wall 6c. The peripheral wall 6b comprises a front peripheral wall 6ba, a back peripheral wall 6bb, a left peripheral wall 6bc, and a right peripheral wall 6bd. Further, the housing 6 comprises a first end portion 15 and a second end portion 14 opposing the first end portion 15.

The top wall 6a is broadly divided into a keyboard container 6aa containing a keyboard 7; a palm rest 6ab to which a touch pad 11, a click button 12, and the like are provided; and a display unit support portion 6ac to which the hinge 13 supporting the display unit 3 is attached. The keyboard container 6aa comprises a keyboard mounting portion 10 to which the keyboard 7 is mounted. The keyboard mounting portion 10 is provided on the top wall 6a, and is an opening portion containing the keyboard 7. In other words, the keyboard container 6aa comprises, on an exterior wall thereof, a depressed portion (keyboard mounting portion 10) that is depressed with respect to the surrounding portion, and the keyboard 7 is fitted into the depressed portion. The palm rest 6ab is provided between the keyboard mounting portion 10 and the second end portion 14 of the housing 6. The display unit support portion 6ac is positioned on a side of the first end portion 15 of the housing 6, and the hinge 13 supporting the display unit 3 is attached thereto. The hinge 13 is provided near the first end portion 15 of the housing 6, and rotatably connects the display housing 8 (display unit 3) and the housing 6 (main body 2).

As illustrated in FIGS. 2 and 3, a substrate 201, a hard disk drive (HDD) 202, an air supply device 203, a heat dissipating member 204, and a heat pipe 205 are mounted in the housing 6 as to oppose to the palm rest 6ab comprised in the main body cover 5. That is to say, the substrate 201 is positioned between the keyboard mounting portion 10 and the second end portion 14. In particular, the substrate 201 comprises an edge portion 201ca along the keyboard mounting portion 10. The edge portion 201ca is supported by a side wall portion 10a of the keyboard mounting portion 10 protruded towards the bottom wall 6c. Consequently, the keyboard 7 and the substrate 201 are mounted inside the housing 6 while not overlapping each other, and the portable computer 1 can be flattened.

Conventionally, there were less demands for decreasing the thickness of the laptop PC, thereby in general, the substrate and the like are mounted to oppose to the keyboard mounting portion 10 on which the keyboard 7 is mounted. In other words, in the conventional laptop PC, the substrate and the like and the keyboard are mounted as to overlap each other. Therefore, it was difficult to decrease the thickness of the housing of the laptop PC due to the thickness of the keyboard, the substrate, and the like. On the other hand, in the embodiment, as illustrated in FIG. 3, the substrate 201, the HDD 202, the air supply device 203, the heat dissipating member 204, and the heat pipe 205 are mounted so as to oppose to the palm rest 6ab. Consequently, (i) the keyboard 7 and (ii) the substrate 201, the HDD 202, the air supply device 203, the heat dissipating member 204, and the heat pipe 205, are mounted so as not to overlap each other. Therefore, the thickness of the housing 6 can be decreased.

The substrate 201 comprises a first face 201b and a second face 201c opposing the first face 201b. On the first face 201b and the second face 201c, a printed wiring drawn on an insulating board by a conductive body such a silver foil is provided. A heat generating electronic component 201a such as a central processing unit (CPU) and a memory is mounted on at least one of the first face 201b and the second face 201c. The substrate 201 functions as a printed circuit board when the electronic component 201a is connected thereto by soldering. The electronic component 201a is a surface mount type electronic component that uses no lead or pin for electrical connection with respect to the substrate 201.

Figure 4:
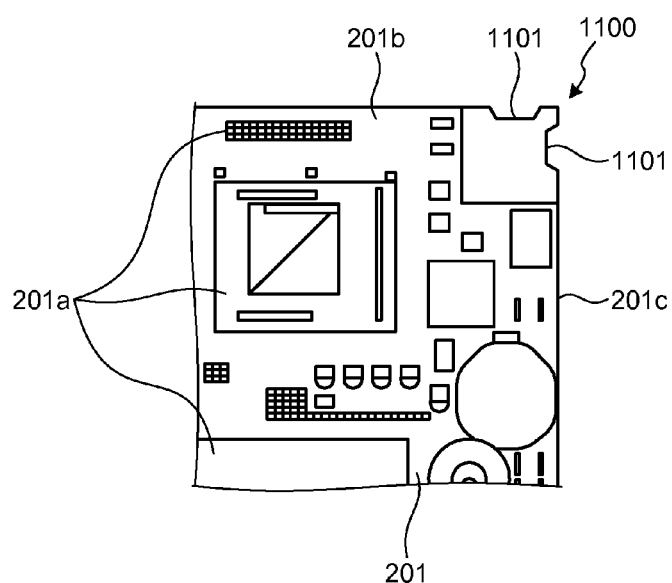
FIG. 4 is an exemplary view of a corner of a substrate mounted in the portable computer in the embodiment.

FIG. 4 is a view of a structure at a corner of the substrate 201 mounted in the portable computer of the embodiment. In the embodiment, as illustrated in FIG. 4, the substrate 201 comprises at a corner 1100 with a cutout portion 1101 having a shape formed by cutting out a portion of the corner 1100. Consequently, the weight of the substrate 201 can be reduced.

The HDD 202 is mounted adjacent to the substrate 201, and connected to the substrate 201 via a flexible wiring board (not illustrated) connected to a connector on the substrate 201. In the embodiment, the main body base 4 and the main body cover 5 (left peripheral wall 6bc) comprises an air outlet 206 discharging the gas within the housing 6 to the outside thereof, at a position opposing a position where the HDD 202 is mounted.

The heat pipe 205 is provided so as to extend from the heat dissipating member 204, and transfers heat generated by the electronic component 201a mounted on the substrate 201 to the heat dissipating member 204.

The heat dissipating member 204 dissipates heat transferred from the heat pipe by utilizing gas supplied from the later-described air supply device 203. The air supply device 203 supplies gas to the heat dissipating member 204 and to inside the housing 6.

In particular, the heat dissipating member 204 comprises a plurality of rectangular plate members arranged so that the surfaces of the plates are along the flow of the gas from the air supply device 203. In the embodiment, the main body base 4 and the main body cover 5 (front peripheral wall 6ba) comprises an air outlet 207 discharging the gas supplied from the air supply device 203 to outside of the housing 6, at a position opposing the position where the heat dissipating member 204 is arranged. The air supply device 203 comprises a centrifugal fan taking in the gas in an axial direction of the rotational axis and blowing the gas in a direction substantially orthogonal to the axial direction of the rotational axis.

Figure 5:
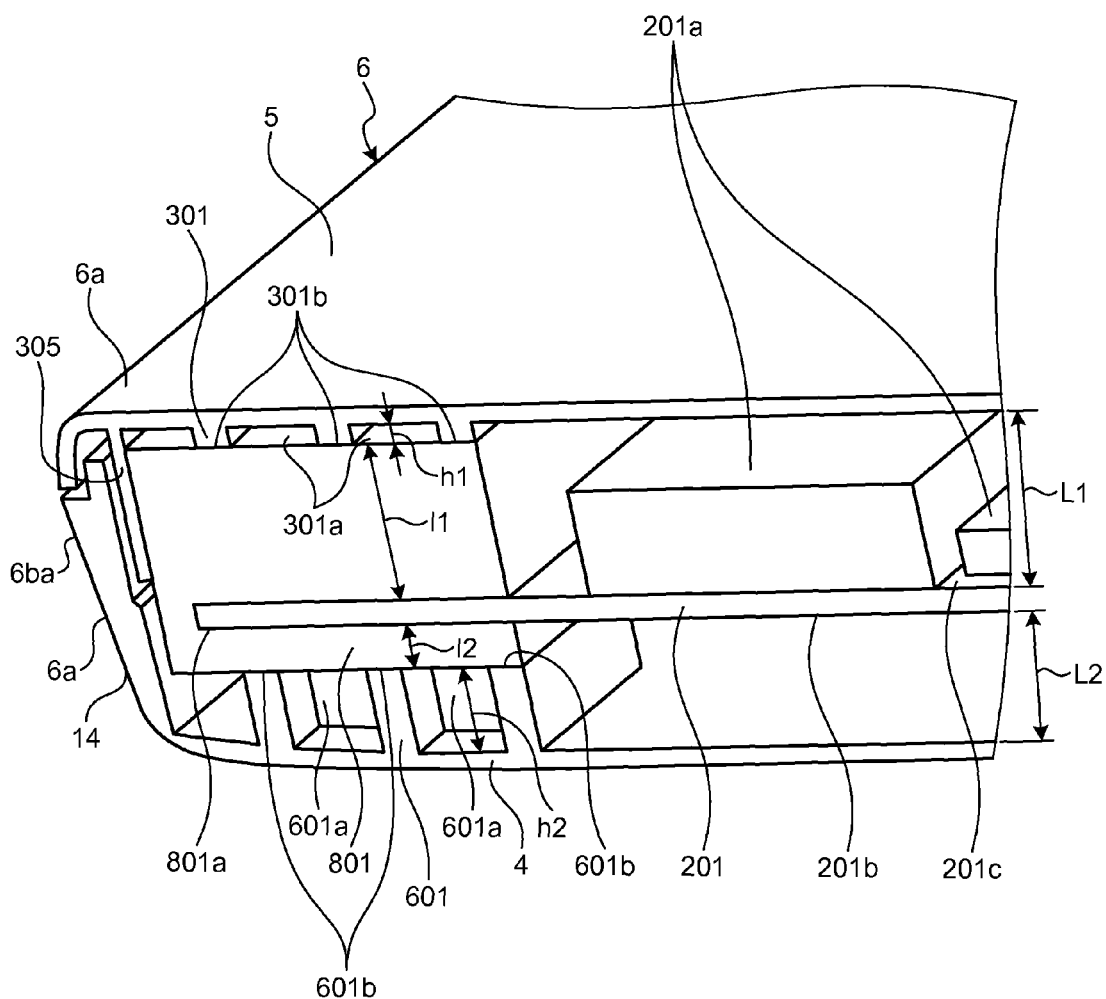
FIG. 5 is an exemplary perspective view of a structure for mounting the substrate in the housing in the embodiment.
Figure 6A:
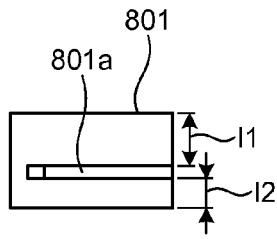
FIGS. 6A to 6D are exemplary four orthogonal views of a heat insulating member disposed on the substrate in the embodiment.
Figure 6B:
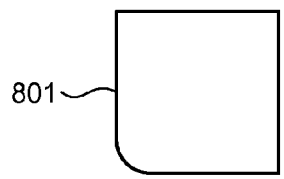
Figure 6C:
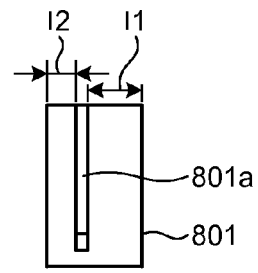
Figure 6D:
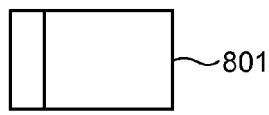
Figure 7:
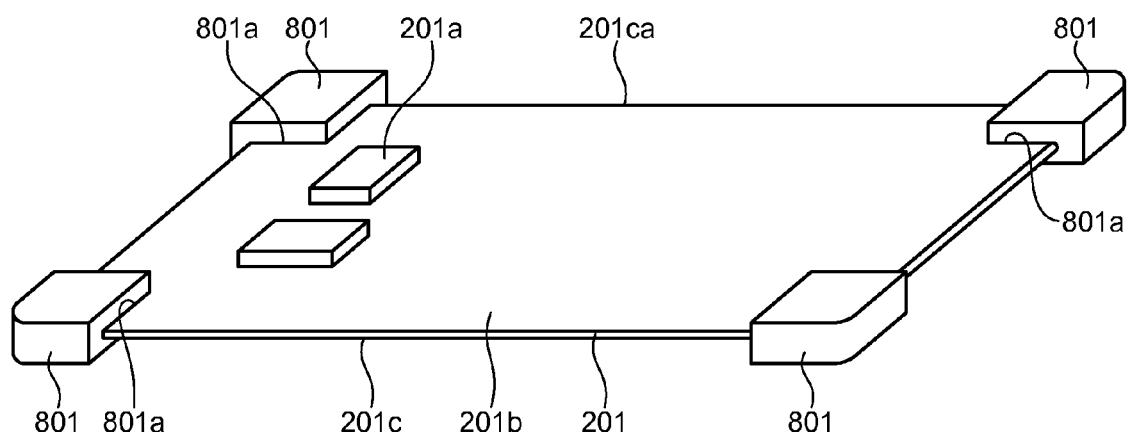
FIG. 7 is an exemplary view illustrating disposition of the heat insulating member with respect to the substrate in the embodiment.
Figure 8:
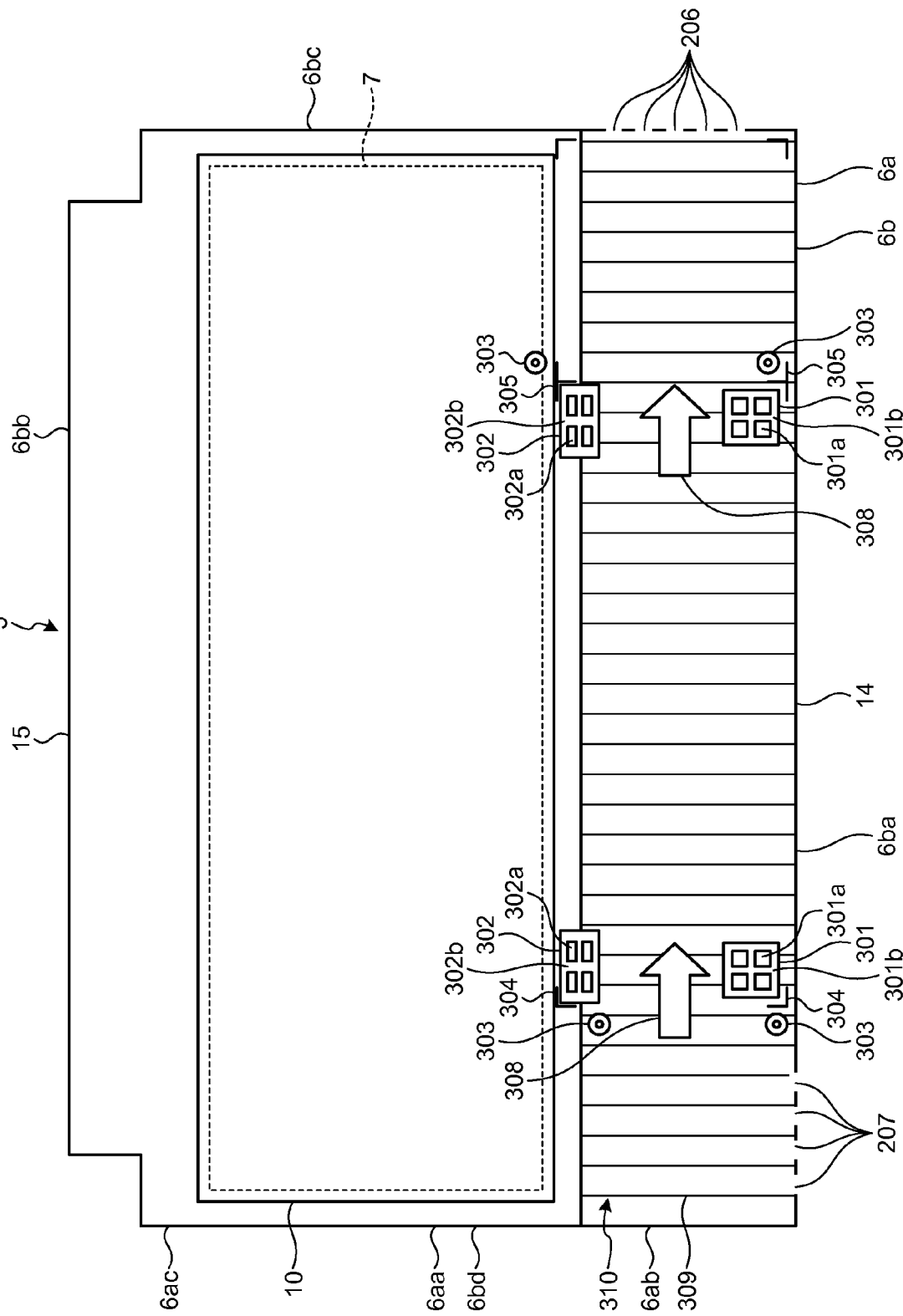
FIG. 8 is an exemplary plan view of one side of the main body cover to which the substrate is mounted in the embodiment.
Figure 9:
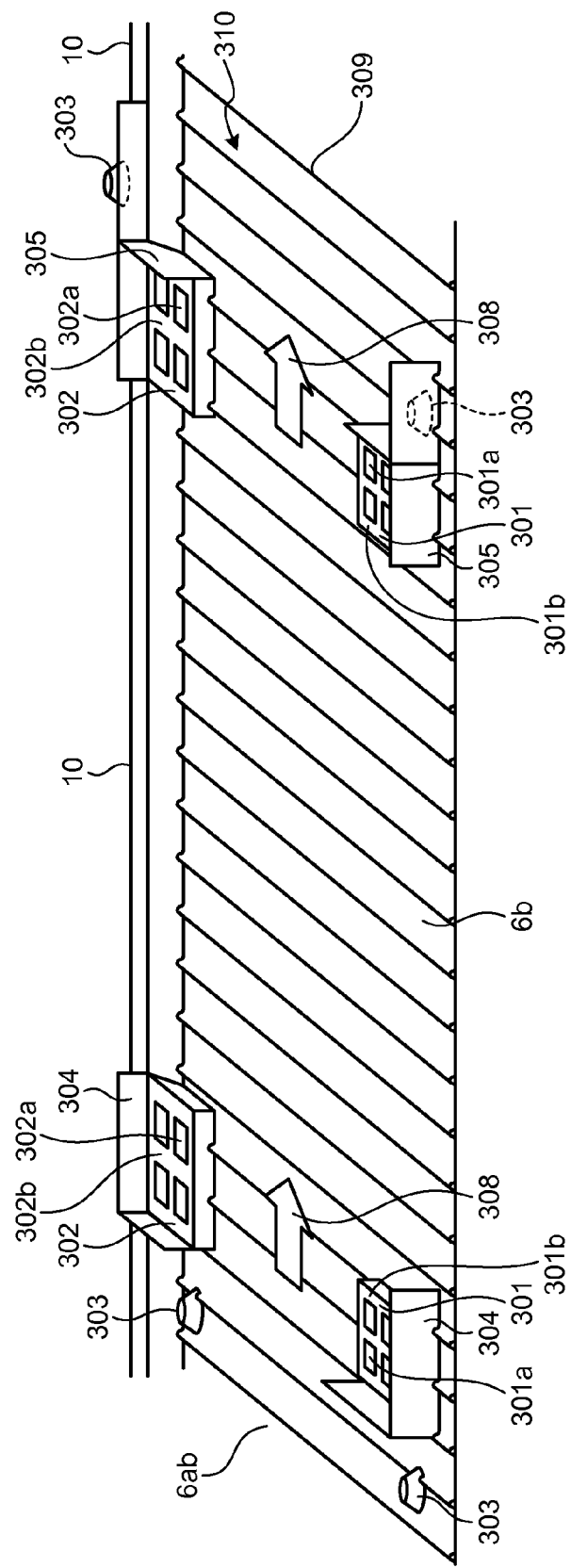
FIG. 9 is an exemplary perspective view of one side of a palm rest to which the substrate is mounted in the embodiment.
Figure 10:
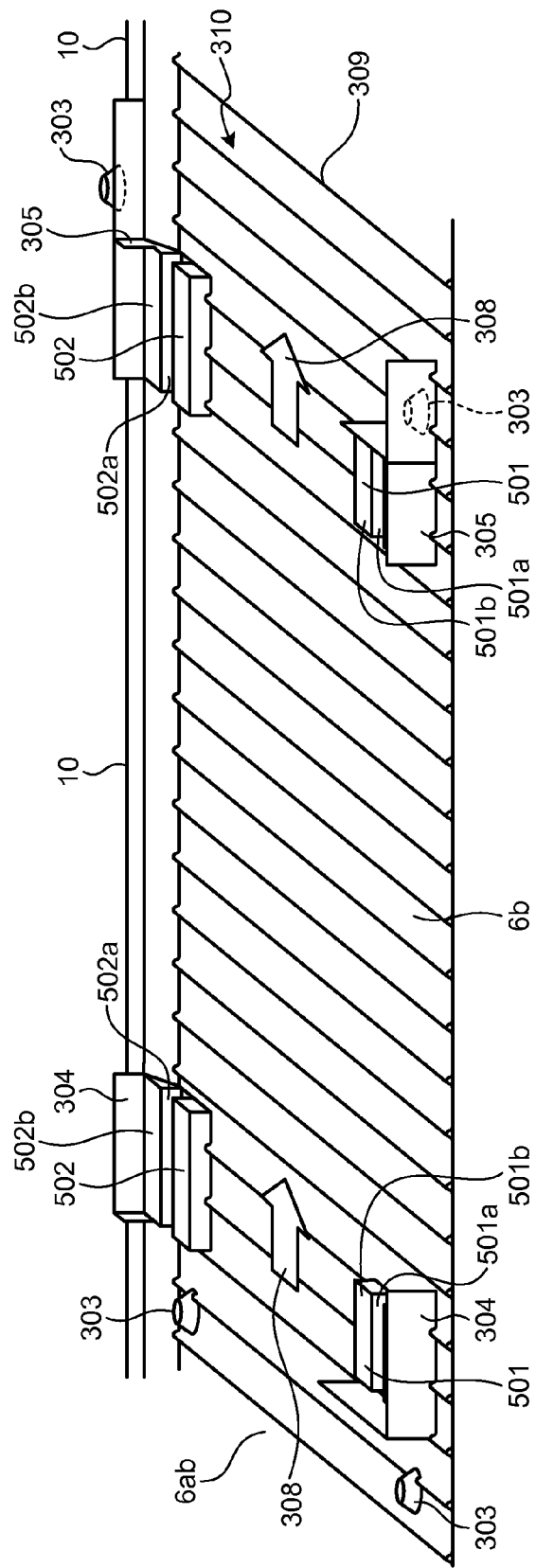
FIG. 10 is another exemplary perspective view of the one side of the palm rest to which the substrate is mounted in the embodiment.
Figure 11:
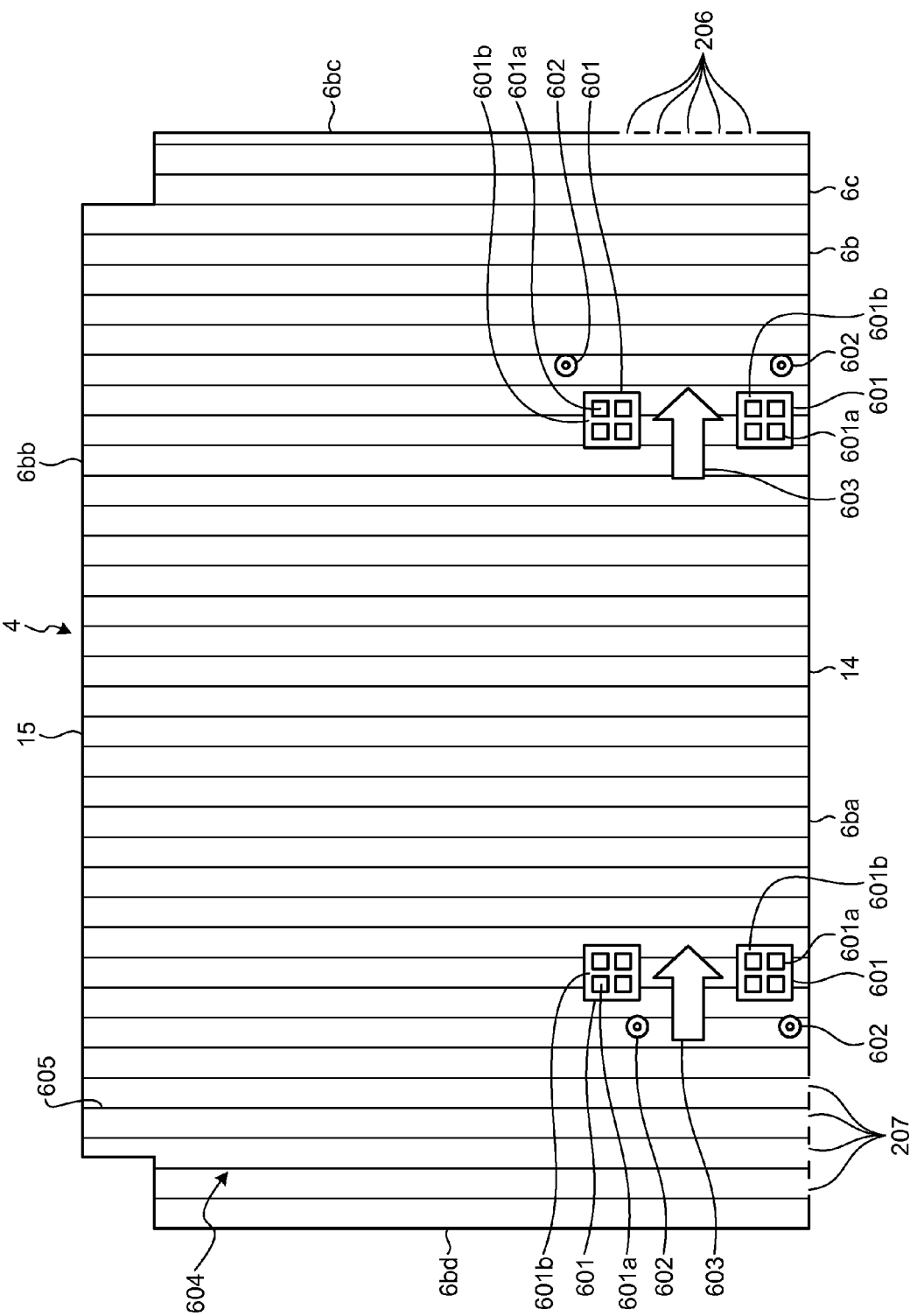
FIG. 11 is an exemplary plan view of one side of a main body base on which the substrate is mounted in the embodiment.
Figure 12:
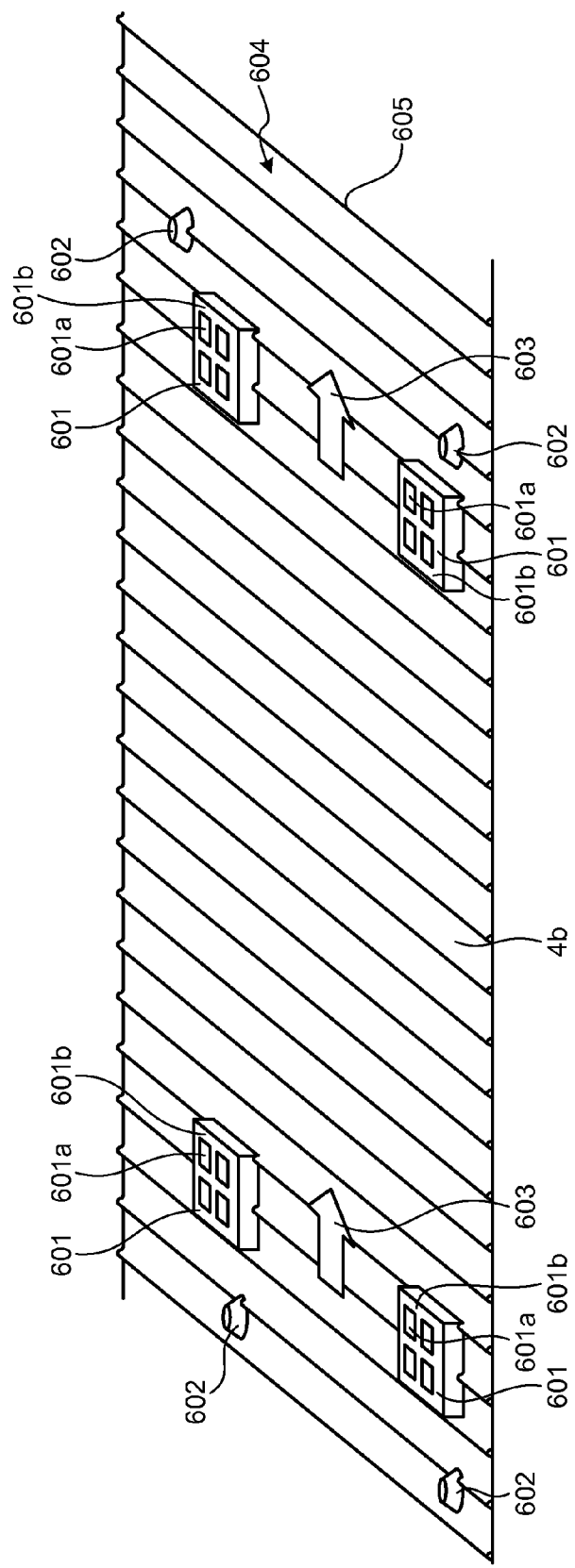
FIG. 12 is an exemplary perspective view of the main body base on which the substrate is mounted in the embodiment.
Figure 13:
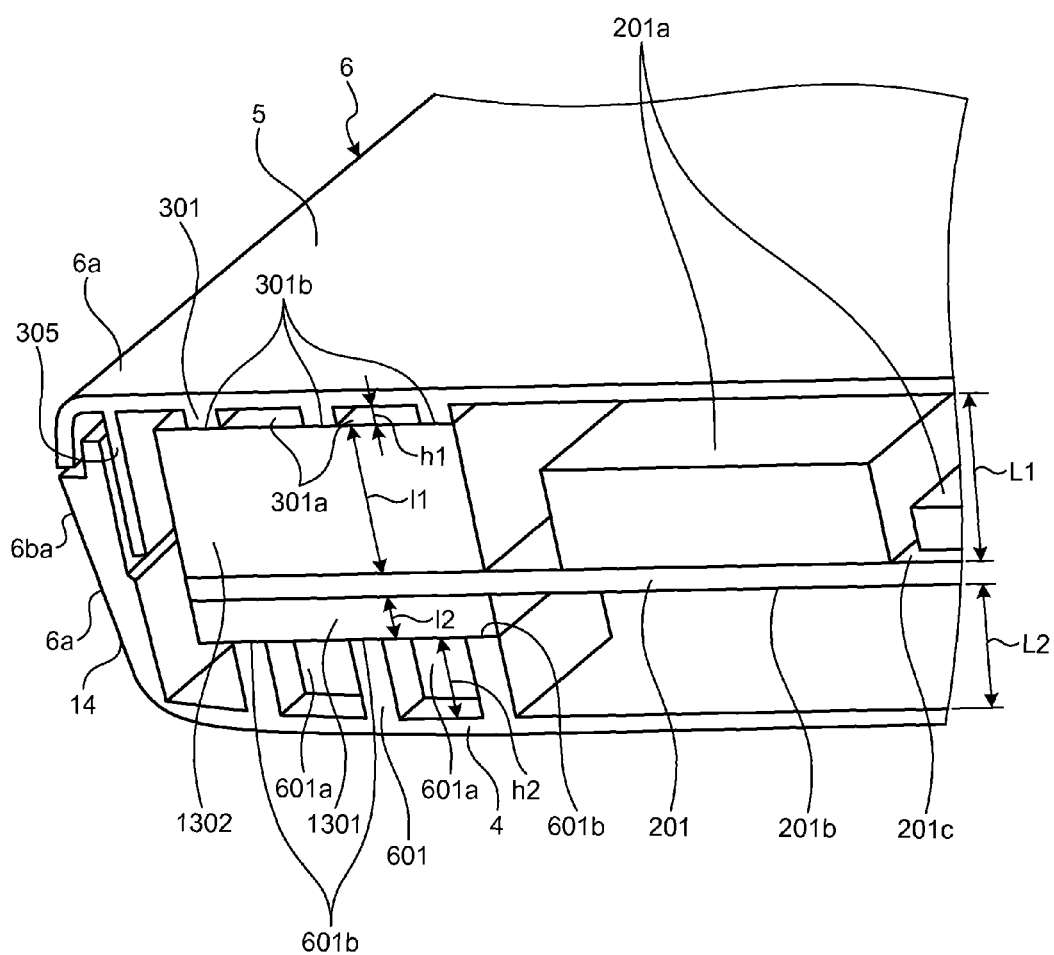
FIG. 13 is another exemplary perspective view of the structure for mounting the substrate in the housing in the embodiment.

Next, with reference to FIGS. 5 to 13, a structure for mounting the substrate 201 within the housing 6 is explained in detail. FIG. 5 is a perspective view illustrating a structure for mounting the substrate 201 within the housing 6. FIGS. 6A to 6D are four orthogonal views of a heat insulating member disposed on the substrate 201. FIG. 7 is a view illustrating the heat insulating member disposed with respect to the substrate 201. FIG. 8 is a plan view illustrating a structure of one side of the main body cover 5 on which the substrate 201 is mounted. FIG. 9 is a perspective view illustrating a structure of one side of the palm rest 6ab on which the substrate 201 is mounted. FIG. 10 is another perspective view illustrating the structure of the one side of the palm rest 6ab on which the substrate 201 is mounted. FIG. 11 is a plan view illustrating a structure of one side of the main body base 4 on which the substrate 201 is mounted. FIG. 12 is a perspective view illustrating a structure of one side of the main body base 4 on which the substrate 201 is mounted. FIG. 13 is another perspective view illustrating the structure for mounting the substrate 201 within the housing 6.

As illustrated in FIGS. 5 and 7, the housing 6 of the portable computer 1 comprises heat insulating member 801 at each of the four corners of the substrate 201. The heat insulating member 801 is provided at each of the four corners continuously from the first face 201b to the second face 201c. In other words, as illustrated in FIGS. 6 and 7, the housing 6 of the portable computer 1 comprises a U-shaped heat insulating member 801 having a groove 801a to which each of the four corners of the substrate 201 is fitted.

As described above, in the embodiment, the substrate 201 comprises the cutout portion 1101 (illustrated in FIG. 4) at the corner 1100 of the substrate 201. Since the corner 1100 is fitted into the groove 801a of the heat insulating member 801, the weight of the substrate 201 can be reduced without changing the exterior appearance of when the substrate 201 is mounted in the housing 6.

As illustrated in FIG. 5, the housing 6 (the main body cover 5 and the main body base 4) of the portable computer 1 holds the substrate 201 at both sides of the first face 201b and the second face 201c of the substrate 201 via the heat insulating member 801.

In the embodiment, the heat insulating member 801 is integrally provided so as to be continuous from the first face 201b to the second face 201c. However, the present embodiment is not limited thereto, and as illustrated in FIG. 13, a first heat insulating member 1301 and a second heat insulating member 1302 may separately be provided on the first face 201b and the second face 201c. In other words, the second heat insulating member 1302 is a first support portion supporting the substrate 201 so that the substrate 201 is spaced apart from the top wall 6a. Consequently, the direct contact between the substrate 201 and the top wall 6a is prevented, thereby the heat conduction from the electronic component 201a mounted on the substrate 201 to the top wall 6a can be reduced.

The side wall portion 10a of the keyboard mounting portion 10 supports the edge portion 201ca of the substrate 201, and protrudes more towards the bottom wall 6c than the second heat insulating member 1302. Consequently, the length of keys of the keyboard 7 mounted on the keyboard mounting portion 10 and protruding from the top wall 6a can be shortened, thereby the thickness of the portable computer 1 can be decreased.

The first heat insulating member 1301 is a second support portion supporting the substrate 201 so that the substrate 201 is spaced apart from the bottom wall 6c. In other words, the substrate 201 is supported by the first heat insulating member 1301 and the second heat insulating member 1302 so as to be spaced apart from the top wall 6a and the bottom wall 6c. Consequently, the direct contact between the substrate 201 and the bottom wall 6c can be prevented, thereby the heat conduction from the electronic component 201a mounted on the substrate 201 to the bottom wall 6c can be reduced.

The heat insulating members 801 is provided at each of the four corners of the substrate 201. However, the embodiment is not limited thereto, and for example, another heat insulating member 801 may be provided near a center of an elongated direction of the rectangular substrate 201, in addition to providing the heat insulating members 801 at the each of the four corners.

The heat insulating member 801 is made of a member with heat conductivity lower than the housing 6. Consequently, the heat from the electronic component 201a can be prevented from transferred to the housing 6 that is in contact with the heat insulating member 801, thereby the user can be prevented from feeling the heat by touching the housing 6.

A flexible member such as a rubber may be used as the heat insulating member 801. When the flexible member is used as the heat insulating member 801, the heat insulating member 801 should be squeezed in a thickness direction thereof at the time when the substrate 201 is held by the housing 6 from both sides of the first face 201b and the second face 201c.

As the heat insulating members 801, it is preferred to use a conductive member such as a gasket and a material into which a conductive material such as a metallic powder is mixed. Consequently, the heat insulating member 801 can function as a ground (GND) for the substrate 201, thereby it becomes unnecessary to newly provide a wiring and the like for grounding the substrate 201.

A thickness 11 of the heat insulating member 801 provided on the second face 201c of the substrate 201 is larger than a thickness 12 of the heat insulating member 801 provided on the first face 201b of the substrate 201. As a result, a distance L1 between the main body cover 5 and the substrate 201 can be set larger than a distance L2 between the main body base 4 and the substrate 201, thereby the heat generated by the electronic component 201a can effectively be prevented from being transferred to the main body cover 5 that is often touched by the user.

As illustrated in FIGS. 8 and 9, a rib 310, a screw stopper 303, and the like are provided on one side of the palm rest 6ab on which the substrate 201 is mounted.

The rib 310 comprises protruding portions 301, 302 opposing the heat insulating member 801 provided to the each of the four corners of the substrate 201. The protruding portions 301, 302 protrude in larger amount towards the substrate 201 than a linear protruding portion 309. The protruding portions 301, 302 are provided so as to oppose the heat insulating member 801 provided at the each of the four corners of the substrate 201, in order to suppress instability of the substrate 201 and to secure a passage for gas flowing in a direction (indicated by arrows 308) within the housing 6. In the embodiment, the protruding portions 301, 302 are provided at a portion of the rib 310. However, when the main body cover 5 has enough strength without providing the rib 310, only the protruding portions 301, 302 can be provided to the palm rest 6ab.

In the embodiment, it is difficult to provide a wiring (not illustrated) extending from the substrate 201 on a side of the keyboard container 6aa because the keyboard container 6aa protrudes towards the substrate 201 by the depressed portion 10. Therefore, in the embodiment, the cross section of the protruding portion 302 provided on the side of the keyboard container 6aa is formed in a rectangular shape with sides in a direction towards the protruding portion 301 being shorter. Consequently, the distance between the protruding portions 301, 302 can be set long, thereby it becomes possible to provide the wiring (not illustrated) extending from the substrate 201, between the protruding portions 301, 302.

The protruding portions 301, 302 comprise rectangular holes 301a, 302a provided on faces 301b, 302b opposing the heat insulating member 801. As a result, the weight of the portable computer 1 can be reduced.

Other shapes of the protruding portion are explained with reference to FIG. 10. In FIG. 9, the holes 301a, 302a are provided on the faces 301b, 302b of the protruding portions 301, 302 opposing the heat insulating member 801. However, grooves 501a, 502a may be provided on faces 501b, 502b of protruding portions 501, 502 opposing the heat insulating member 801, along a direction (indicated by the arrows 308) of the flow of the gas flowing inside the housing 6. Consequently, the weight of the portable computer 1 can be reduced, and the gas flowing inside the housing 6 can flow inside the protruding portions 501, 502, thereby the heat transferred from the substrate 201 can effectively be dissipated.

As illustrated in FIGS. 5, 8, and 9, the rib 310 comprises guide ribs 304, 305 protruding in a larger amount towards the substrate 201 than the linear protruding portion 309, at near the protruding portions 301, 302 (outer edge of the corner of the substrate 201). The substrate 201 is fitted into an interior side of the guide ribs 304, 305 provided near the protruding portions 301, 302. Consequently, dislocation of the substrate 201 in the housing 6 can be prevented, and further, miss-positioning and miss-mounting of the substrate 201 can be prevented. The heat insulating member 801 provided at each of the four corners of the substrate 201 is provided continuously from the first face 201b to the second face 201c, and the side face of the substrate 201 does not directly contact the guide ribs 304, 305. Therefore, the heat from the electronic component 201a mounted on the substrate 201 can be prevented from being transferred to the housing 6 via the guide ribs 304, 305.

As in the embodiment, when the substrate 201 and the HDD 202 are mounted to be adjacent to each other, the guide rib 305 to be arranged between the substrate 201 and the HDD 202 can be used as a guide rib of the HDD 202. In the embodiment, the guide ribs 304, 305 are provided for the main body cover 5. However, the embodiment is not limited thereto as long as the guide ribs 304, 305 are provided to at least one of the main body base 4 and the main body cover 5.

The screw stopper 303 is arranged near the guide ribs 304, 305 (near the heat insulating member 801), and fixes the main body cover 5 and the main body base 4 by screwing the screw inserted from a screw stopper 602 (see FIGS. 11 and 12) of the main body base 4. According to the portable computer 1 of the embodiment, the substrate 201 is not directly attached to the housing 6 via the screw. As a result, the main body cover 5 might be spaced apart from the main body base 4 due to instability of the substrate 201, deflection of the heat insulating member 801 existing between the substrate 201 and the housing 6, and the like. Therefore, the screw stopper 303 is provided near the guide ribs 304, 305 (near the position where the heat insulating member 801 is provided) so as to prevent the main body cover 5 from being spaced apart from the main body base 4.

As illustrated in FIGS. 11 and 12, a rib 604, the screw stopper 602, and the like are provided on one side of the main body base 4 on which the substrate 201 is mounted.

The rib 604 is for preventing deformation of the main body base 4, and is provided such that a linear protruding portion 605 is provided over an entire face of the main body base 4, from one end on a side at which the display unit 3 is supported to another end opposing to the one end. The rib 604 opposes to the heat insulating member 801 provided at each of the four corners of the substrate 201, and comprises a protruding portion 601 protruding towards the substrate 201 in a larger amount than the linear protruding portion 605. The protruding portion 601 is provided so as to oppose to the heat insulating member 801 provided at each of the four corners of the substrate 201 so as to suppress instability of the substrate 201 and to maintain a passage of gas flowing in a direction (indicated by arrows 603) within the housing 6. As illustrated in FIG. 5, the height h2 of the rib 604 towards the substrate 201 is larger than the height h1 of the protruding portions 301, 302 of the main body cover 5 towards the substrate 201 because the height of the electronic component 201a mounted on the first face 201b from the first face 201b is larger than the height of the electronic component 201a mounted on the second face 201c.

The protruding portion 601 comprises a rectangular hole 601a on a face 601b opposing the heat insulating member 801. Consequently, the weight of the portable computer 1 can be reduced. The protruding portion 601 may have the shape similar to that of the protruding portions 501, 502 illustrated in FIG. 10.

The screw stopper 602 (fixing portion) is arranged near the protruding portion 601 (near the heat insulating member 801). A screw is inserted into the main body base 4 from a side opposite to the side at which the substrate 201 is mounted, and the screw is screwed into the screw stopper 303 on a side of the main body cover 5. As a result, the main body base 4 is fixed to the main body cover 5. In the portable computer 1 of the embodiment, the substrate 201 is not directly attached to the housing 6 by a screw. As a result, the main body cover 5 might be spaced apart from the main body base 4 due to instability of the substrate 201, deflection of the heat insulating member 801 existing between the substrate 201 and the housing 6, and the like. Hence, the screw stopper 303 is provided near the protruding portion 601 (near the heat insulating member 801) to prevent the main body cover 5 from being spaced apart from the main body base 4.

As described above, according to the portable computer 1 of the embodiment, the substrate 201, the heat insulating member 801, and the housing 6 are provided. On at least one of the first face 201b and the second face 201c opposing the first face 201b of the substrate 201, the electronic component 201a is mounted. The heat insulating member 801 is continuously provided from the first face 201b to the second face 201c at each of the for corners of the substrate 201. The housing 6 holds the substrate 201 from both sides of the first face 201b and the second face 201c, over the heat insulating member 801. As a result, the substrate 201 can be fixed to the housing 6 while maintaining the substrate 201 and the housing 6 not in direct contact with each other, and the transferring of the heat from the electronic component 201a to the housing 6 can be delayed. Consequently, the increase in the surface temperature of the housing 6 can be suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a housing comprising: a first wall portion comprising an operating face; and a second wall portion positioned opposite the first wall portion;
   a substrate housed in the housing, and provided with a cutout portion at a corner thereof; and
   a flexible support portion with heat conductivity lower than that of the housing, the support portion being configured to hold the corner from both sides of the substrate at a position where the substrate is spaced apart from the first wall portion and the second wall portion.

2. An electronic device comprising:
   a housing comprising: a first wall portion comprising an operating face; and a second wall portion positioned opposite the first wall portion;
   a substrate housed in the housing, and provided with a cutout portion at a corner thereof; and
   a heat insulating member configured to hold the corner from both sides of the substrate at a position where the substrate is spaced apart from the first wall portion and the second wall portion.

3. The electronic device of claim 2, wherein a touch pad is provided to the first wall portion in a state in which the touch pad is spaced apart from and layered on the substrate.

4. The electronic device of claim 2, wherein a protrusion configured to support the heat insulating member is provided to at least one of the first wall portion and the second wall portion.

5. The electronic device of claim 4, wherein a depressed portion is provided at a contact portion between the protrusion and the heat insulating member.

6. The electronic device of claim 2, wherein the heat insulating member comprises:
   a first portion configured to be in contact with the first wall portion;
   a second portion configured to be in contact with the second wall portion; and
   a third portion configured to support the substrate between the first portion and the second portion.

7. The electronic device of claim 6, wherein a guide portion configured to guide an opposite side of the third portion of the heat insulating member is provided to one of the first wall portion and the second wall portion.

8. The electronic device of claim 2, wherein the substrate and an air supply device positioned within the housing are provided along an end portion of the housing, the air supply device being configured to supply air to flow through a spacing between the substrate and one of the first wall portion and the second wall portion.

9. The electronic device of claim 8, wherein the heat insulating member is provided in a state in which the air hits the heat insulating member.

10. The electronic device of claim 9, wherein a plurality of protrusions configured to support the heat insulating member are provided to at least one of the first wall portion and the second wall portion and provided in a state in which the air flows between the protrusions.

* * * * *